Dec. 28, 1926.
C. MOCCIA
STALLED AUTOMOBILE MOVING ATTACHMENT
Filed March 3, 1926
1,612,392
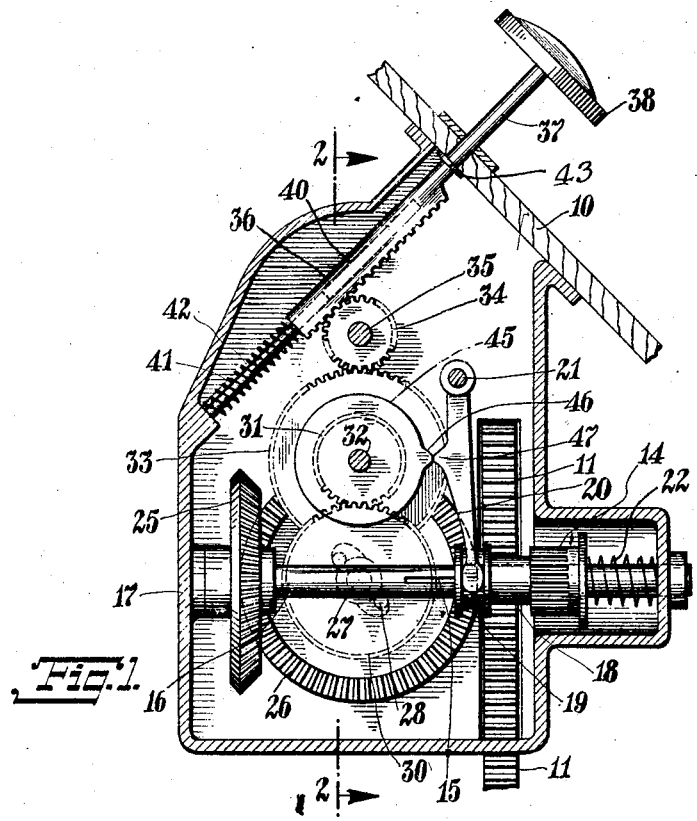
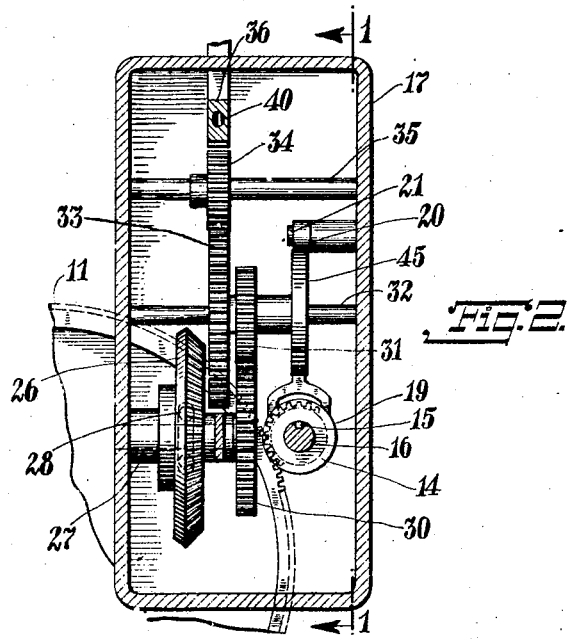
INVENTOR
Constantino Moccia
BY
ATTORNEY Patented Dec. 28, 1926.

1,612,392

UNITED STATES PATENT OFFICE.

CONSTANTINO MOCCIA, OF LYNCH, KENTUCKY.

STALLED-AUTOMOBILE MOVING ATTACHMENT.

Application filed March 3, 1926. Serial No. 92,023.

This invention relates to an attachment for automobiles, by the use of which the automobile may be readily moved a short distance such as may be necessary to remove it from the stream of traffic in the event of the engine stalling.

The invention has for an object the provision of a novel and simple device of this sort which may be manually operated by the driver of the automobile while in his seat.

For further comprehension of the invention, and of the objects and advantages thereof, reference will be had to the following description and accompanying drawing, and to the appended claims in which the various novel features of the invention are more particularly set forth.

Fig. 1 of the drawing is a longitudinal sectional view of my improved device showing it applied to an automobile, this view being taken on the line 1—1 of Fig. 2.

Fig. 2 is a transverse sectional view of the device, this view being taken on the line 2—2 of Fig. 1.

In the drawing the reference numeral 10 indicates the usual inclined footboard in the front of the automobile flooring, while 11 indicates the usual gear on the flywheel of the engine shaft, this gear being used for starting the automobile engine.

This gear 11 is adapted to be engaged, when the device is put into use, by a gear pinion 14 feathered as at 15 on a shaft 16 mounted in a casing element 17 that may be formed in one with the usual flywheel casing or separately therefrom, the pinion having a hub extension 18 formed with a grooved element 19 that has engaged therewith the forked lower end of a lever 20 fulcrumed at its upper end as at 21 in the casing 17 and adapted to be moved, as will be presently set forth, to free the pinion 14 from the gear 11, the pinion being urged toward the said gear by an expansion spring 22 coiled around the shaft 16 and bearing on the pinion, the lever 20 acting to normally retain the pinion disengaged from the gear.

Fixed to the shaft 16 is a bevel gear 25 that meshes with a like gear 26 loose on a transverse shaft 27, the gear 26 having an ordinary one-way clutch connection, indicated at 28, with the shaft 27. Fixed to the shaft 27 is a spur gear 30 that meshes with a spur pinion 31 on a second transverse shaft 32 located above the shaft 27, the shaft 32 having fixed thereon a spur gear 33 engaged by a spur pinion 34 on a third transverse shaft 35 located in the upper part of the casing 17. The pinion 34 is engaged by a rack bar 36 having an extended stem or rod 37 at one end that passes through the footboard 10 and having a footpedal 38 on its rear end. The rack bar 36 is formed with a longitudinal boring 40 entered thereinto from the other end thereof, and in which engages a guide pin 41 fixed to the casing 17, this pin being surrounded by a light expansion spring 42 that urges the rack bar 36 backward, movement of the rack bar under the influence of the spring 42 being limited by a collar 43 on the bar that engages the footboard 10. The shaft 32, before mentioned, has also fixed thereon a cam disk 45 having a short cam rise 46 on its periphery that engages a nose 47 on the lever 20.

In the operation of the device, the driver alternately presses and releases the foot pedal 38. As the rack bar 36 advances, movement is imparted to the shaft 16 through the train of reducing gears, while on the initial movement of the rack bar the rise 46 on the cam 45 is freed from the nose 47 on the lever 20, and the spring 22 urges the pinion 14 forward to mesh with the gear 11 on the engine flywheel. As the rack bar moves backward, under the influence of the spring 42, the clutch 28 permits the shaft 16 to remain stationary, or to continue advancing. By continued operation of the foot pedal 38 the automobile may be moved such distance as may be needed to turn it around a corner, or into the curb, when the engine stalls.

Having thus described my invention, what I claim as new and desire to protect by Letters Patent of the United States is as follows:

1. In an automobile, in combination with a gear fixed to the flywheel of the automobile engine, a rack bar slidable in the automobile and adapted for manual operation, a shaft, a reducing gear connection between the said rack bar and the said shaft, a gear pinion feathered on said shaft and adapted to be moved into and out of engagement with the said gear on the engine flywheel, and an element operatively connected to the said reducing train of gears for moving the said gear pinion along the said shaft.

2. In an automobile, in combination with a gear fixed to the flywheel of the automobile engine, a rack bar slidable in the automobile and adapted for manual operation, a shaft, a reducing gear connection between the said rack bar and the said shaft, a gear pinion feathered on said shaft and adapted to be moved into and out of engagement with the said gear on the engine flywheel, and an element operatively connected to the said reducing train of gears for moving the said gear pinion along the said shaft, said element comprising a lever, and a cam disk on said reducing train engaging said lever.

In testimony whereof I have affixed my signature.

CONSTANTINO MOCCIA.